United States Patent [19]
Takaoka

[11] Patent Number: 5,467,561
[45] Date of Patent: Nov. 21, 1995

[54] AUTOMATED HIGH-RAISED PARKING SYSTEM

[75] Inventor: Shigekazu Takaoka, Kasugai, Japan

[73] Assignee: Daifuku Co., Ltd., Osaka, Japan

[21] Appl. No.: 960,116

[22] Filed: Oct. 13, 1992

[30] Foreign Application Priority Data

Oct. 14, 1991 [JP] Japan .................................. 3-264228
Oct. 15, 1991 [JP] Japan .................................. 3-265727

[51] Int. Cl.⁶ ........................................ E04H 6/06
[52] U.S. Cl. .................... 52/30; 52/143; 187/266; 414/239
[58] Field of Search ...................... 52/30, 33, 175, 52/143; 414/229, 239, 264, 259, 486; 269/58; 187/266

[56] References Cited

U.S. PATENT DOCUMENTS

| | | | |
|---|---|---|---|
| 1,016,691 | 2/1912 | Ihlder | 187/266 |
| 1,047,330 | 12/1912 | Sundh | 187/266 |
| 1,071,309 | 8/1913 | Goggin | 187/266 X |
| 1,085,952 | 7/1914 | Sundh | 187/266 X |
| 3,101,130 | 8/1963 | Bianca | 187/266 X |
| 4,936,730 | 6/1990 | Morioka | 414/239 |
| 5,000,292 | 3/1991 | Chapelain | 52/30 X |
| 5,018,926 | 5/1991 | Sternad | 514/239 X |
| 5,025,893 | 6/1991 | Saito | 187/266 |
| 5,116,182 | 5/1992 | Lin | 414/264 X |
| 5,118,239 | 6/1992 | Morioka | 414/239 X |

FOREIGN PATENT DOCUMENTS

| | | | |
|---|---|---|---|
| 602179 | 12/1926 | France | 414/239 |
| 519248 | of 1979 | Italy | 52/30 |

*Primary Examiner*—Carl D. Friedman
*Assistant Examiner*—Beth A. Aubrey
*Attorney, Agent, or Firm*—Webb Ziesenheim Bruening Logsdon Orkin & Hanson

[57] ABSTRACT

An automated high-raised parking system is disclosed. The system has a parking construction including a parking rack structure having a plurality of stories of parking racks for parking an automobile as mounted on a pallet, a lift passage for a lift-translator device, the passage being formed besides the parking racks. The lift-translator device includes a lift table and a translator device. An automobile entrance/exit section is provided for allowing entrance and exit of the automobile to and out of the construction. A holding unit is provided at a predetermined height of the entrance/exit section for holding the pallet so as to maintain a horizontal posture of this pallet mounting the automobile. The automobile as mounted on the lift table is vertically moved to a predetermined rack and then translated by the translator device onto this rack. A turntable device is provided at the entrance/exit section. This device includes a turntable which swivellably holds the pallet mounting the automobile thereon so that an orientation of the automobile on the pallet is changed by swiveling this turn table, and includes also an elevator mechanism for elevating the turntable so as to allow an upward movement of the pallet relative to the height of the entrance/exit section.

12 Claims, 9 Drawing Sheets

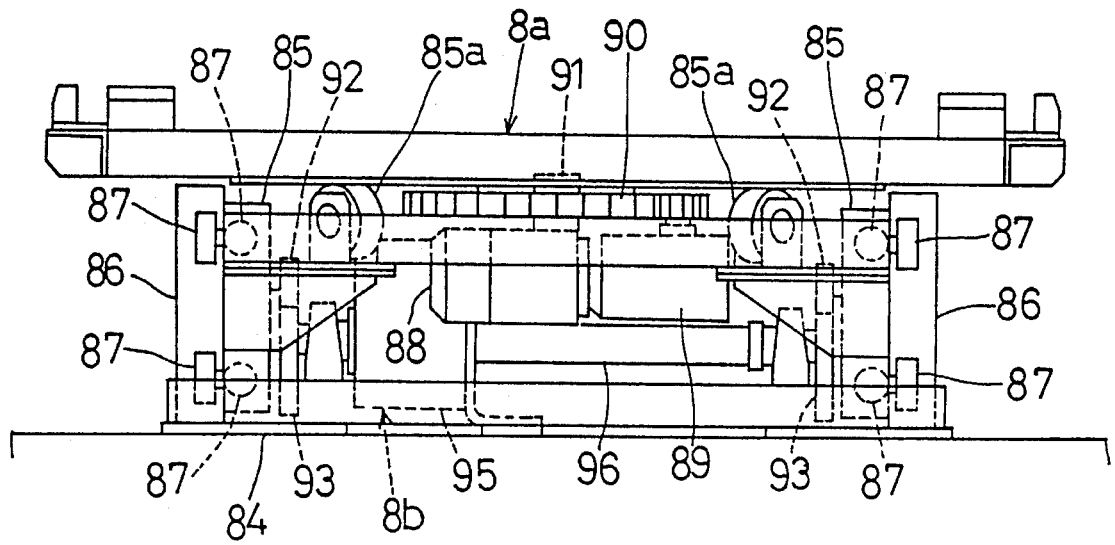
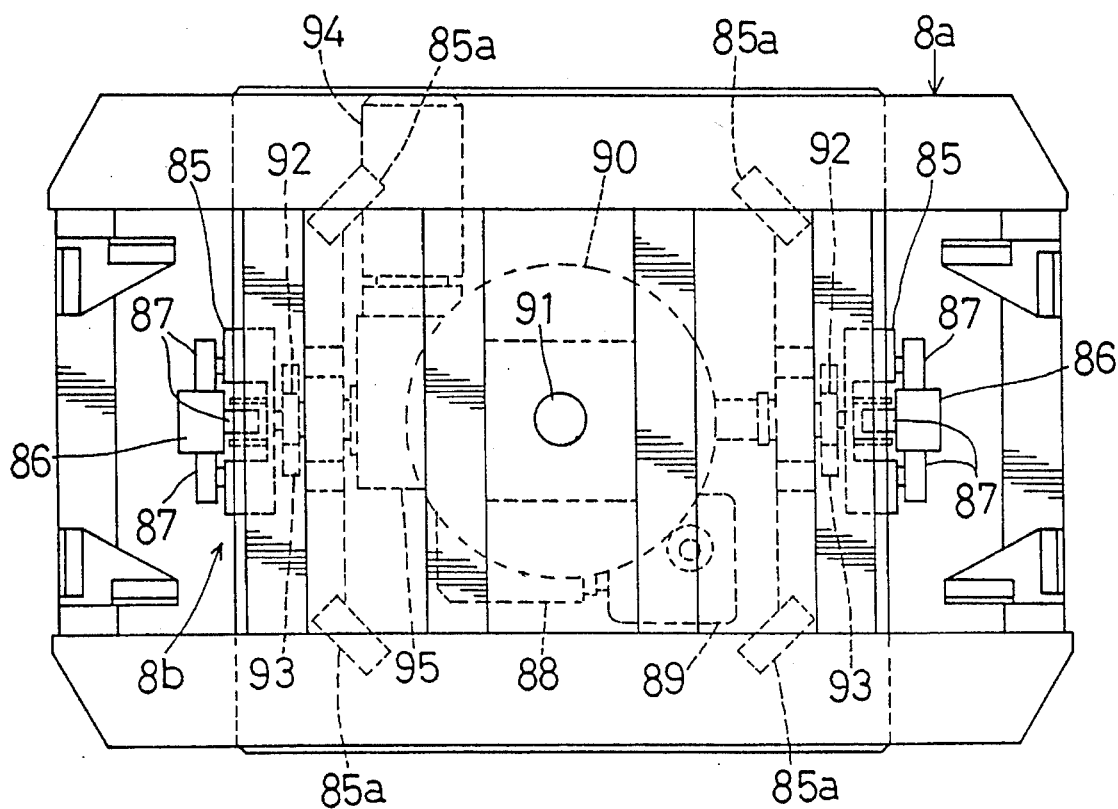

AUTOMATED HIGH-RAISED PARKING SYSTEM

BACKGROUND OF THE INVENTION

1. Field of the Invention

The present invention relates to an automated high-raised parking system, and more particularly to an automated high-raised parking system including a parking construction having a plurality of stories of parking racks each having a pallet for mounting an automobile body thereon, a lift passage vertically formed beside the racks for a lift-translator device consisting essentially of a lift table and a translator device such that the automobile body as mounted on the table is lifted up to one of the racks and then translated onto this rack, the system further including, at an entrance or exit area of the construction, a turntable device for turning an orientation of the automobile by swiveling a turntable which swivellably holds, at a center thereof, the pallet mounting the automobile body.

2. Description of the Related Art

FIG. 13 illustrates a conventional automated high-raised parking system. In this system, an automobile A, which is introduced or withdrawn at an entrance or exit area (in this conventional system, an entrance area and an exit area are combined as a single entrance-exit area 7), is placed onto a pallet 3. In order to maintain a horizontal posture of this pallet 3 mounting the automobile, a pair of lifters 31, 32 are provided at opposed supporting ends of the pallet 3. Then, these lifters 31, 32 are capable of moving the pallet 3 from the height of the entrance-exit area to a lower position. By lowering these lifters 31, 32, the pallet 3 mounting the automobile A is lowered to a height of a mounting surface of a turntable 8 which swivellably holds, at a center thereof, the pallet 3 mounting the automobile A. After the pallet is placed onto the turntable 8, this turntable 8 is turned to change the orientation of the automobile A.

The above-described conventional system has one disadvantage of requiring vertical space for allowing the lowering movement of the pallet 3 from the height of the entrance-exit area to the lower position, and this additional space requirement entails in addition the installment costs of the parking system.

SUMMARY OF THE INVENTION

The present invention attends to the above disadvantage of the convention. It is, therefore, a primary object of the present invention to provide an automated high-raised parking system with improvement which allows to reduce the above-described additional space thereby to reduce the entire system costs.

For accomplishing the above-noted object, an automated high-raised parking system, according to the present invention, comprises:

a parking construction including;

a parking rack structure having a plurality of stories of parking racks for parking an automobile as mounted on a pallet, a lift passage for a lift-translator device, the lift passage being formed besides the parking racks, the lift-translator device including a lift table and a translator device, and an automobile entrance/exit section for allowing entrance and exit of the automobile to and out of the parking construction, a holding unit being provided at a predetermined height of said entrance/exit section for holding ends of said pallet so as to maintain a horizontal posture of said pallet mounting the automobile, within the parking construction the automobile as mounted on the lift table being vertically moved to a predetermined rack and then translated by the translator device onto this rack; and a turntable device provided at said entrance/exit section, the device including a turntable which swivellably holds, at a center thereof, the pallet mounting the automobile thereon so that an orientation of the automobile on the pallet is changed by swiveling said turn table, the turntable device further including an elevator mechanism for elevating said turntable so as to allow an upward movement of said pallet turntable relative to the height of said entrance/exit section.

Functions and effects of the above-defined system of the present invention will be described next.

An automobile is introduced onto the pallet at the entrance/exit section of the system. The horizontal posture of this pallet mounting the automobile is maintained by the holding unit through its support of the pallet at its ends. Then, the elevator mechanism of the turntable device is activated to elevate the pallet mounted on the turntable of this turntable device. Thereafter, as the turntable is swiveled, the orientation of the automobile is changed. Finally, the lift-translator device is activated to lift this automobile on its lift table up to a predetermined parking rack and translated onto this rack for parking.

For exit of a parked automobile, the pallet carrying this automobile is mounted on the lift table and then lowered to a position immediately above the entrance/exit section. Then, this pallet is moved onto the turntable of the turntable device for changing the orientation of the automobile. As the elevator mechanism of this turntable device is activated, the pallet mounted on the turntable is lowered onto the holding unit provided at the entrance/exit section. The horizontal posture of the pallet carrying the automobile is maintained by the holding unit.

As described above, according to the system construction of the present invention, unlike the conventional system, it is not necessary to move the automobile-carrying pallet downwardly from the height of the entrance/exit section. Thus, the system of the invention has eliminated the vertical space for allowing the downward movement thereby to reduce the entire installation costs of the system.

According to one preferred embodiment of the present invention, the system will be realized to be described next.

At the entrance/exit section, the holding unit is provided at a predetermined height for holding ends of the pallet so as to maintain a horizontal posture of this pallet mounting the automobile.

The turntable device includes a turntable having an engaging portion engageable from below with an engaged portion of the pallet, a pallet-mounting portion on which the pallet is mounted with its movement in the turning direction restricted and swivellable with a swiveling movement of the turntable, and an elevator mechanism for elevating the pallet from its height supported by the holding unit to a predetermined upper position by lifting the pallet-mounting portion within a predetermined range.

The engaging portion and the engaged portion are vertically movable relative to each other and the engaged condition between these engaging and engaged portions is maintained also when the pallet-mounting portion is lifted up to an upper limit of the predetermined range.

Functions and effects of this construction will be described next.

An automobile is introduced onto the pallet at the entrance/exit section of the system. The horizontal posture of this pallet mounting the automobile is maintained by the holding unit through its support of the pallet at its ends. Then, the elevator mechanism of the turntable device is activated to elevate the pallet mounted on the pallet-mounting portion up to the upper limit of the predetermined range. In this condition, the pallet carrying the automobile is placed on the pallet-mounting portion and also the engaged condition between the engaging portion of the turntable and the engaged portion of the pallet is still maintained, such that with a swiveling operation of the turntable, the orientation of the automobile is changed. Finally, the lift-translator device is activated, so that this automobile is lifted on the lift table up to a predetermined parking rack and translated onto this rack for parking.

For exit of a parked automobile, the pallet carrying this automobile is mounted on the lift table and then lowered to a position immediately above the entrance/exit section. Then, the pallet-mounting portion of the turntable device is moved upwards to the upper limit position of the predetermined range to mount the pallet thereon; and then the turntable of the turntable device is swiveled. As the engaged condition between the engaging portion of the turntable and the engaged portion of the pallet is still maintained in this condition, with the swiveling movement of the turntable the orientation of the automobile is changed. Thereafter, as the elevator mechanism of the turntable device is activated to lower the pallet-mounting portion, the pallet mounted thereon is placed onto the holding unit, so that the horizontal posture of the pallet carrying the automobile is maintained by the support of this holding unit.

As described above, according to the above-described system, it is not necessary to move the automobile-carrying pallet downwardly from the height of the entrance/exit section. Thus, the system of the invention has eliminated the vertical space for allowing the downward movement thereby to reduce the entire installation costs of the system.

Moreover, with the construction of the invention, while a portion (i.e. the pallet-mounting portion) of the turntable device needs to be moved vertically, the turntable of the turntable device per se does not make any vertical movement. Therefore, with this elimination of vertical movement of the turntable, the elevator mechanism of the turntable device can rely on a relatively small drive power source.

Further and other objects, features and effects of the invention will become more apparent from the following more detailed description of the embodiments of the invention with reference to the accompanying drawings.

BRIEF DESCRIPTION OF THE DRAWINGS

FIG. 2 is a vertical section showing major portions of the automated high-raised parking system, FIG. 3 is a plane view of the major portions of the automated high-raised parking system.

DESCRIPTION OF THE PREFERRED EMBODIMENTS

Figure 1:
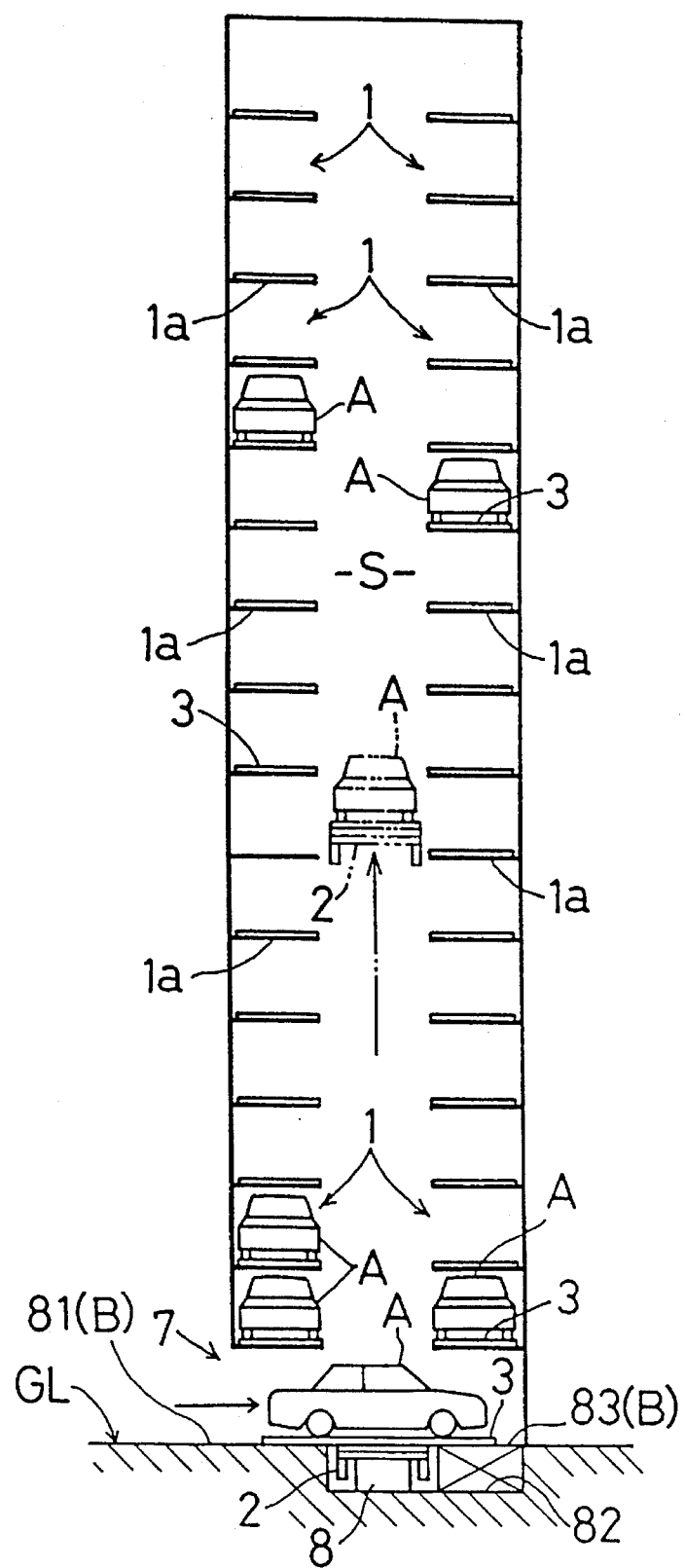
FIG. 1 is a vertical section illustrating an entire construction of an automated high-raised parking system according to one preferred embodiment of the present invention.

Preferred embodiments of an automated high-raised parking system relating to the present invention will now be described in details with reference to the accompanying drawings. In these drawings, same reference numerals or marks are used to denote components of the present invention if they correspond to their equivalents of the conventional system.

FIGS. 1 through 7 illustrate an automated high-raised parking system according to one preferred embodiment of the present invention. This system includes a parking construction as shown in FIG. 1. The construction accommodates a pair of forward and rear (i.e. relative to a front side of the construction) parking rack structures 1 arranged apart from each other with a space S therebetween, and each structure has a plurality of stories of parking racks 1a for parking an automobile sideways. At the space S, there is formed a lift passage for a lift-translator device including a lift table for lifting up an automobile A mounted sideways on a pallet 3. On the ground-level area of the construction, there is provided an automobile entrance/exit section 7 for allowing entrance and exit of the automobile with its fore-and-aft orientation which is normal to the above-described sideways orientation of parking. The entrance/exit section 7 has its opening at the front face of the construction on the ground-level area.

Figure 7:
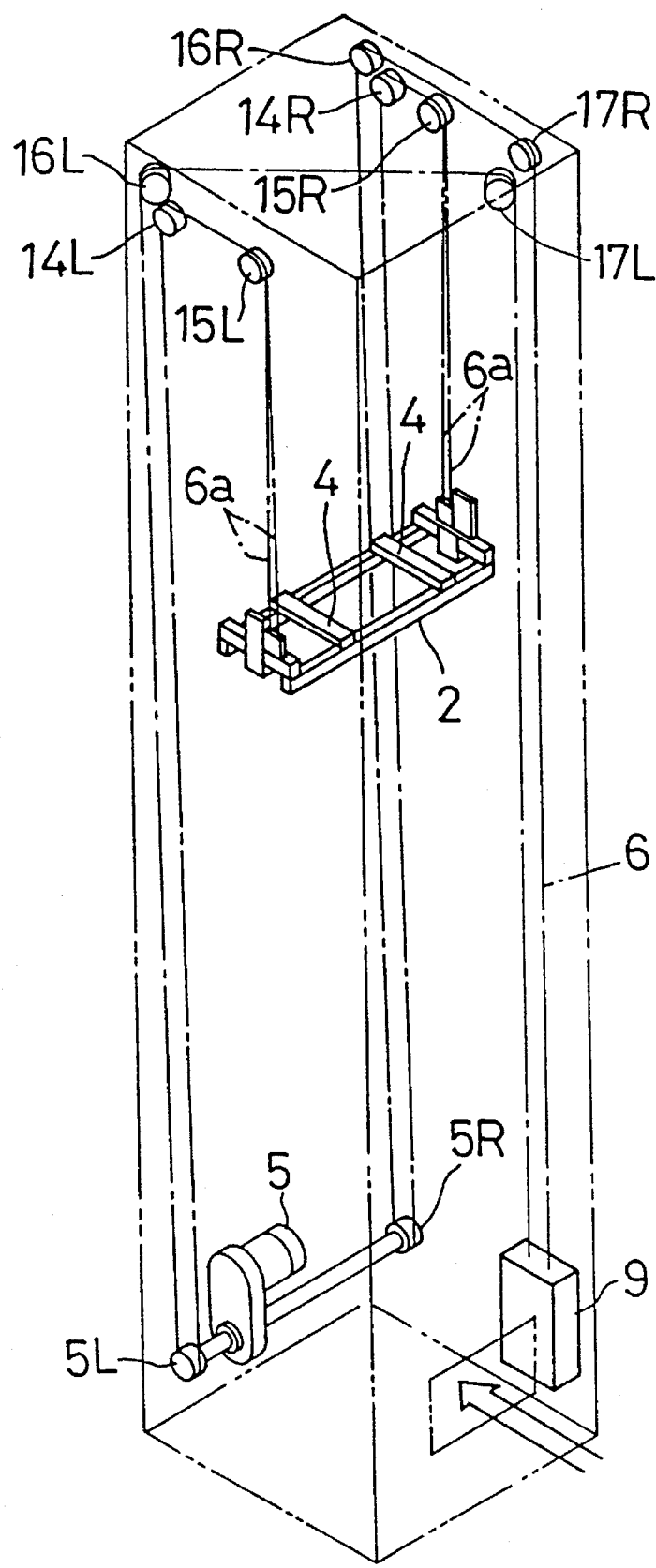
FIG. 7 is a perspective view of a lift-translator device.

As illustrated in FIG. 7, the lift table 2 has its right and left ends suspended by a cable 6 which ends 6a are driven in the vertical direction by means of a cable drive unit 5, such that with drive of the cable 6 the automobile A is lifted up or down along the parking rack structures 1. The lift table 2 is equipped with a translator device 4 for translating the pallet 3 mounting the automobile A onto one of the racks 1a of the rack structure 1 or onto a turntable 8a of a turntable device 8 to be described later.

The cable 6, as best shown in FIG. 7, is guided by a pair of right and left drive pulleys 5L, 5R rotated by the drive unit 5 at the ground-level area, and the opposed right and left guided sides of the cable 6 are suspended upwards therefrom.

The upward suspended extensions of the cable 6 have one side thereof (namely, the forward side) reeved around first guide pulleys 14L, 14R and second guide pulleys 15L, 15R, such that the cable extensions change their directions to be consequently connected at their ends with the right and left ends of the lift table 2 to suspend this table.

On the other hand, the cable extensions on the other side (i.e. the rear side) are reeved around third guide pulleys 16L, 16R and fourth guide pulleys 17L, 17R to change their directions, and consequently their terminal ends are connected with a common balance weight 9 to suspend this weight 9.

The translator device 4, as described hereinbefore, is used for translating the pallet 3 mounting the automobile A and carried on the lift table 2 onto the parking rack structure 1 (used also for translating the pallet from the rack structure 1 onto the lift table 2). This translator device 4 includes a pair of right and left expandable forks so as to selectively provide a state where the forks are longitudinally expanded from the center of the lift table 2 and a further state where the forks are accommodated within the area of the table 2.

As illustrated in FIG. 1, at the ground-level area of the parking construction, a turntable device 8 is provided for changing an orientation of an introduced automobile A to suit the lifting operation of this automobile A by the lift table 2 or for changing the orientation of a withdrawn automobile A to suit its exit from the construction. At a predetermined height of this area, there is also provided a holding unit B for supporting opposed ends of the pallet 3 mounting the introduced or withdrawn automobile A in such a manner as to maintain a horizontal posture of this pallet 3.

Figure 4:
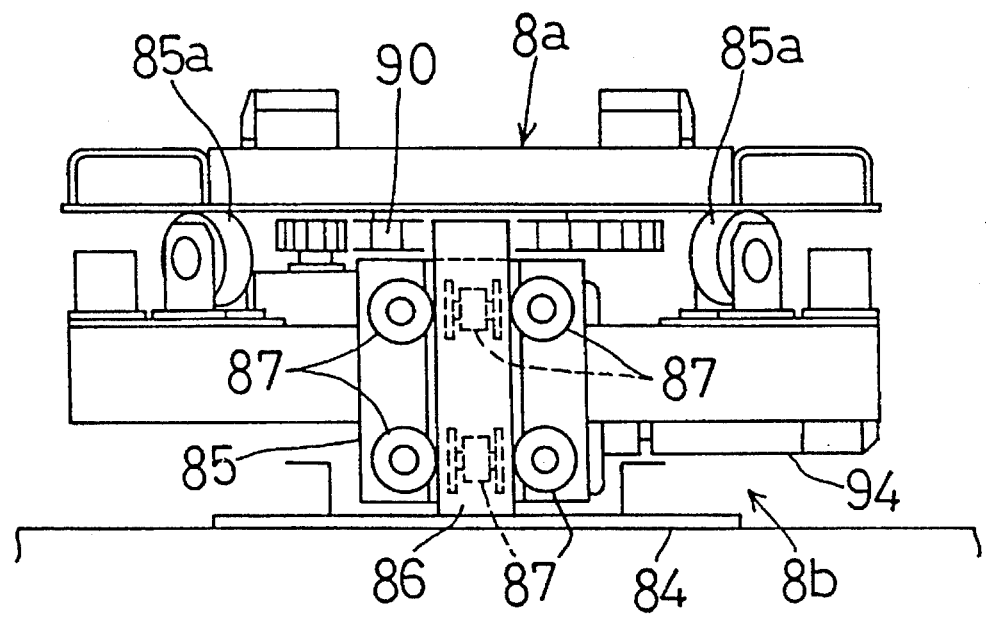
FIG. 4 is a rear view of the major portions of the automated high-raised parking system.
Figure 5:
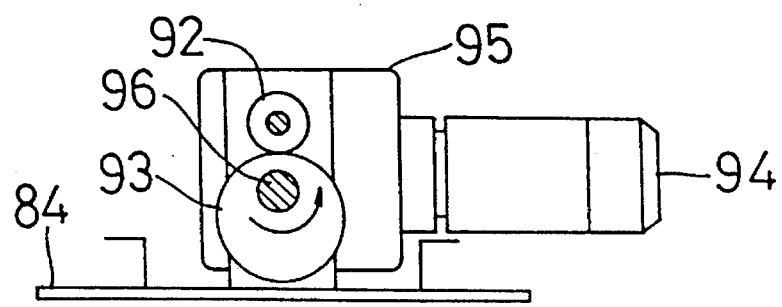
FIG. 5 is a rear view showing a drive unit for an elevator mechanism.
Figure 6:
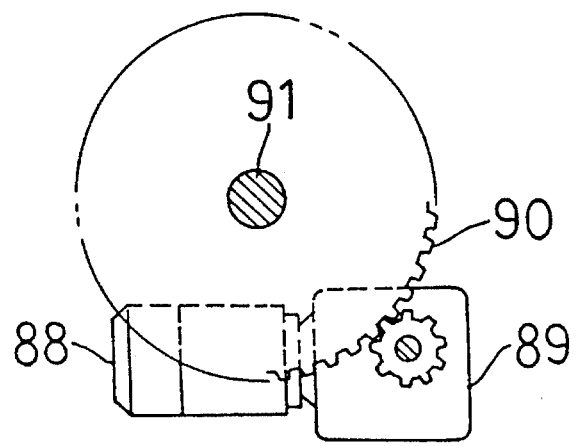
FIG. 6 is a plane view showing a drive unit for a turntable.

Referring to FIG. 4, the turntable device 8 includes a turntable 8a for swivellably carrying, at a center thereof, the pallet 3 mounting the automobile A, such that with a swiveling operation of this turntable 8a the orientation of the automobile A is varied in the above-described manners. To describe these operations more specifically, the automobile A is introduced with its fore-and-aft orientation through the entrance/exit section 7. Then, by the turntable 8a, the orientation of the automobile A is varied to the sideways suitable for the lift-up operation by the lift table 2. Reversely, the automobile A, which has been lowered with the sideways orientation, is translated by the translator device 4 onto the turntable 8a of the turntable device 8 to be changed into the longitudinal orientation.

The turntable device 8 further includes an elevator mechanism 8b for lifting up and down the pallet 3 placed on the turntable 8a between the height position of the entrance/exit area and an upper position.

Specific constructions of the turntable 8a and the elevator mechanism 8b will be particularly described next with reference to FIGS. 1 through 6.

As best shown in FIG. 1, on a ground-level floor GL at the entrance/exit area 7, a forward ground portion 81 is formed at the same level as the floor, and rearwardly of the forward ground portion a pit 82 is dug into the ground. Within this pit 82, a block 83 is laid to provide the same height as the ground-level floor GL. The forward ground portion 81 of the ground-level floor GL and the block 83 together provide the holding unit B for supporting opposed ends of the pallet 3 mounting the introduced or withdrawn automobile A as to maintain the horizontal posture of this pallet 3.

As shown in FIGS. 2 through 4, on a bottom surface of the pit 82, there is disposed a base structure 84. This base structure 84 includes, at two forward and rear positions thereof relative to the entrance/exit section 7, vertically extending guide posts 86 each having a rectangular section in its plane view. Each guide post 86 is surrounded, at its three sides, by three guide rollers 87 which are attached to an elevator frame 85 and are placed in rotatable contact with the guide post 86, so that as being guided through this rotatable contact the elevator frame 85 is moved up and down. Further, inwardly of the rollers towards the elevator frame 85, there is provided a cam follower 92 having a circular configuration in its side view. For vertically moving this cam follower 92, an eccentric cam 93 is attached to the base structure 84. These members constitute a cam mechanism (see FIG. 5) through which the elevator frame 85 is supported. And, through cam movement of the mechanism, the elevator frame 85 can move up and down. That is, the cam mechanism comprising the combination of the cam follower 92 and the eccentric cam 93 and its drive unit together constitute the elevator mechanism 8b. Incidentally, the eccentric cam 93 is attached to an innermost end portion of an elevator shaft 96 to which a drive force of an elevator drive motor 94 attached to the base structure 84 is transmitted through a reduction mechanism 95.

The elevator frame 85 carries, at four peripheral positions thereof, four bearing rollers 85a. as being rotatably supported and guided by these bearing rollers 85a, the turntable 8a is swiveled about an axis of a swivel shaft 91. Further, the turntable 8a mounts a swiveling gear 90 (see FIG. 6) which receives the power from a swiveling drive motor 88 through a reduction mechanism 89, such that with this power the turntable 8a effects a swiveling movement as being guided by the bearing rollers 85a.

A further embodiment of the present invention will be described next.

Figure 11:
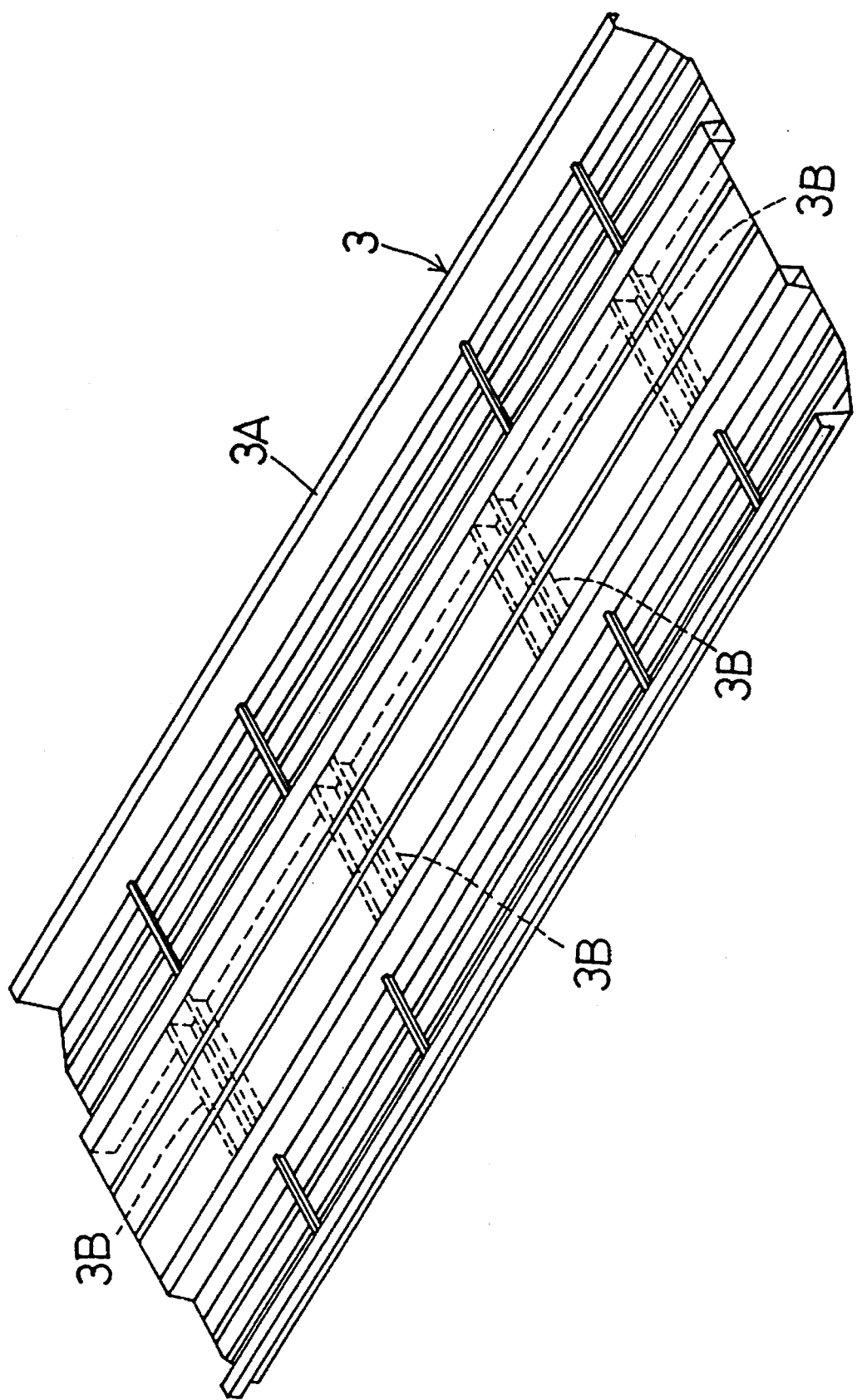
FIG. 11 is an upward perspective view of a pallet.

As illustrated in details in FIG. 11, the pallet 3 used in this further embodiment comprises a combination of a plate member 3A having a convex section with a widthwise center portion thereof being raised relative to the rest and a reinforcing member 3B for reinforcing a bottom portion of the plate member 3A.

Figure 12:
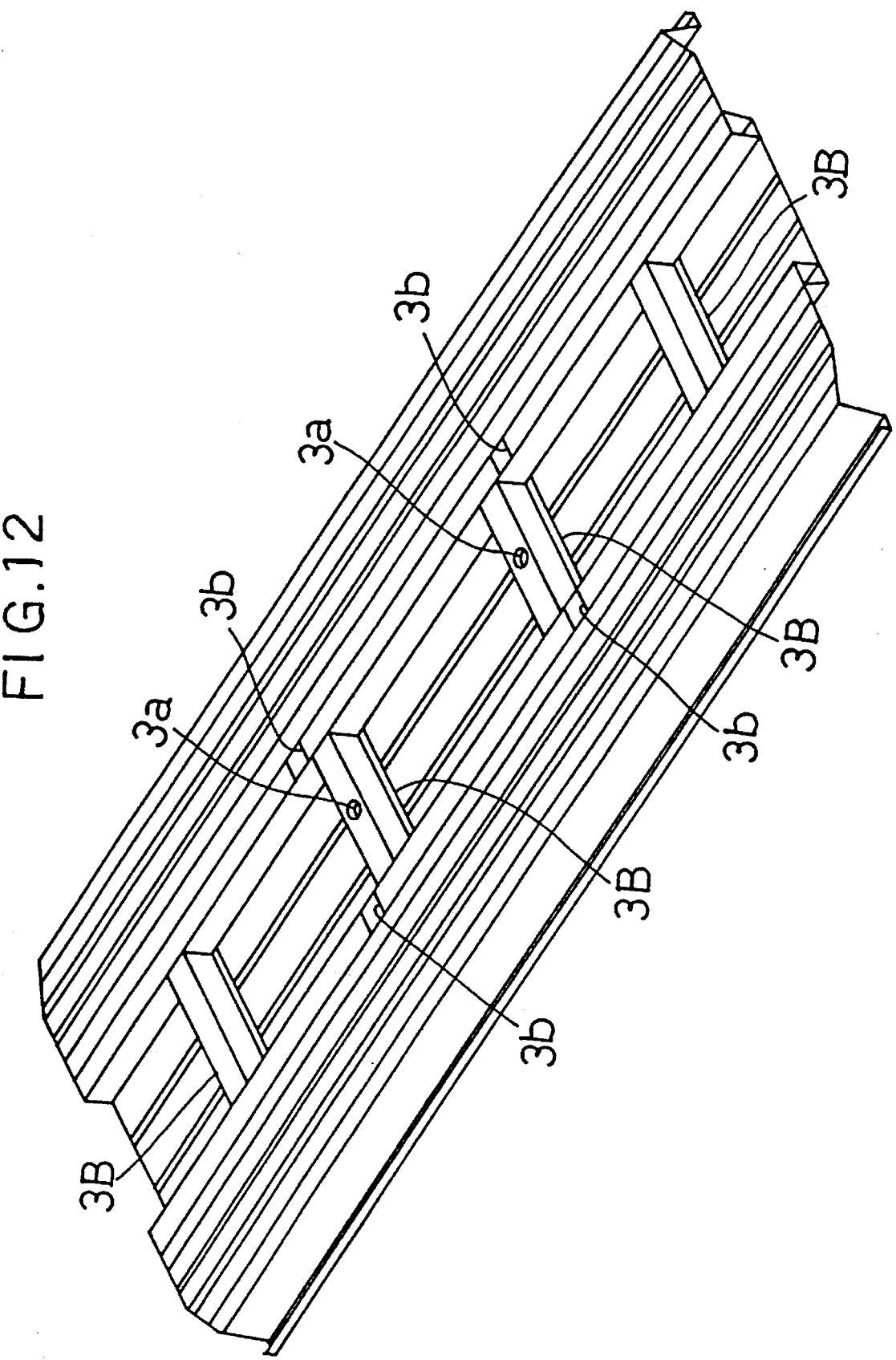
FIG. 12 is a downward perspective view of the pallet.
Figure 13:
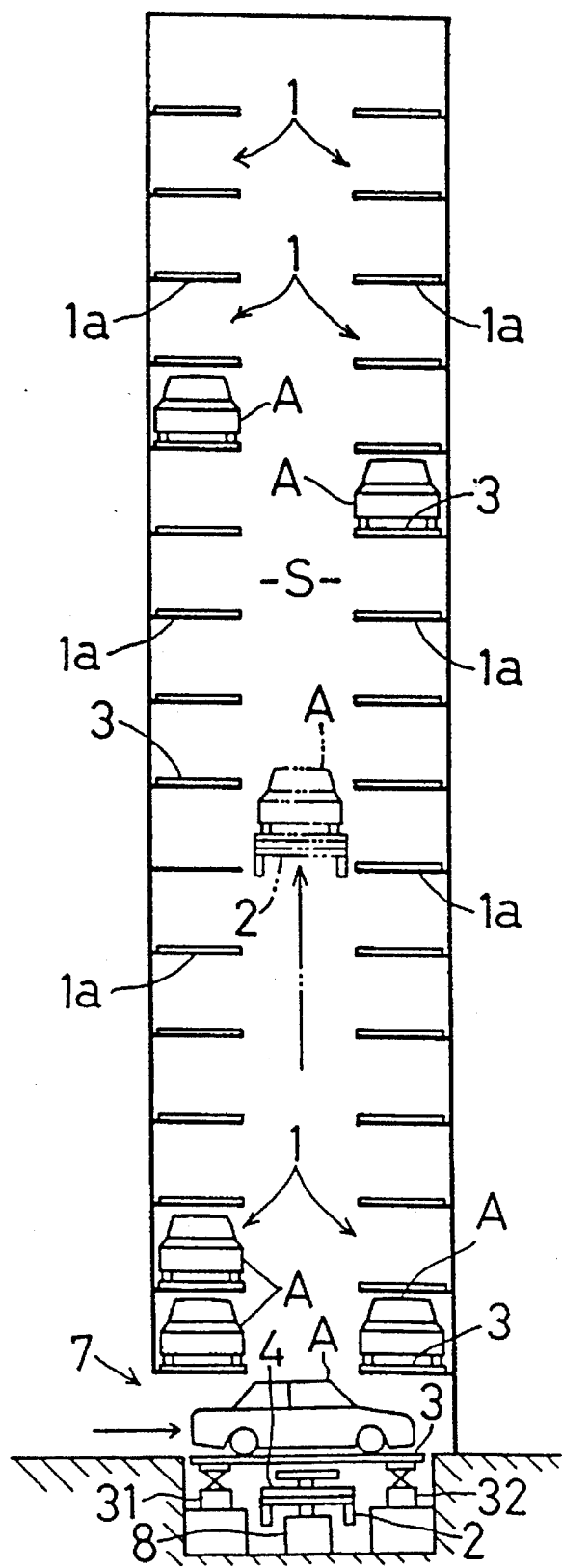
FIG. 13 is a vertical section illustrating major portions of an automated high-raised parking system according to the prior art.

The reinforcing member 3B includes an engaged portion 3a (specifically, a through hole 3a shown in FIG. 12 having a circular shape in its plane view) engageable with an engaging portion 10a (to be described later) formed in a turntable 10 which is a component of the turntable device 8. Further, the plate member 3A includes an engaged portion 3b (specifically, a cutout portion 3b shown in FIG. 12 having a rectangular shape in its plane view) engageable with an engaging portion 11a (to be detailed later) formed in a pallet-mounting portion 11 comprising another component of the turntable device 8.

The turntable device 8 is constructed so as to swivellably support, at a center thereof, the pallet 3 on which the automobile A has been placed at the entrance/exit section 7. With a swiveling movement of the device 8, the orientation of the automobile A can be varied. That is, the automobile A, which has been introduced through the entrance/exit section 7 with the longitudinal orientation, has this orientation changed by the turntable device 8 to the sideways orientation suitable for the lifting operation. Similarly, in case the automobile A has been lowered in the sideways orientation on the lift table 2, this automobile A is translated by the translator device 4 onto the turntable device 8, on which the orientation of the automobile is changed to the longitudinal orientation.

The specific construction of the holding unit B will be particularly described next.

As best shown in FIG. 1, on the ground-level floor GL at the entrance/exit area 7, the forward ground portion 81 is formed at the same level as the floor, and rearwardly of the forward ground portion the pit 82 is dug into the ground. Within this pit 82, the block 83 is laid to provide the same height as the ground-level floor GL. The forward ground portion 81 of the ground-level floor GL and the block 83 together provide the holding unit B for supporting opposed ends of the pallet 3 mounting the introduced or withdrawn automobile A as to maintain the horizontal posture of this pallet 3.

Next, the specific construction of the turntable device 8 will be described.

Figure 8:
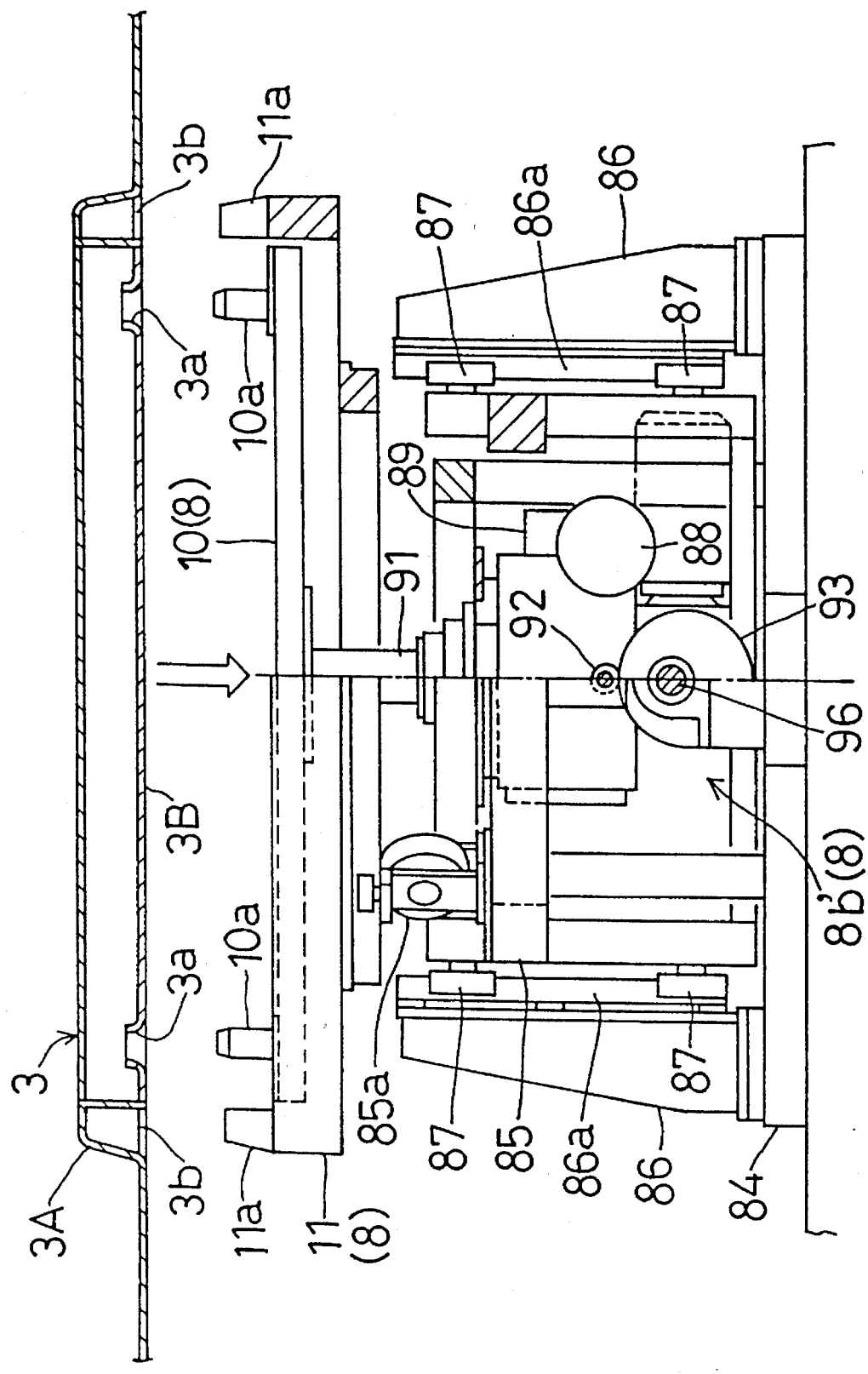
FIG. 8 is a vertical section illustrating major portions of an automated high-raised parking system according to a further embodiment of the present invention.
Figure 9:
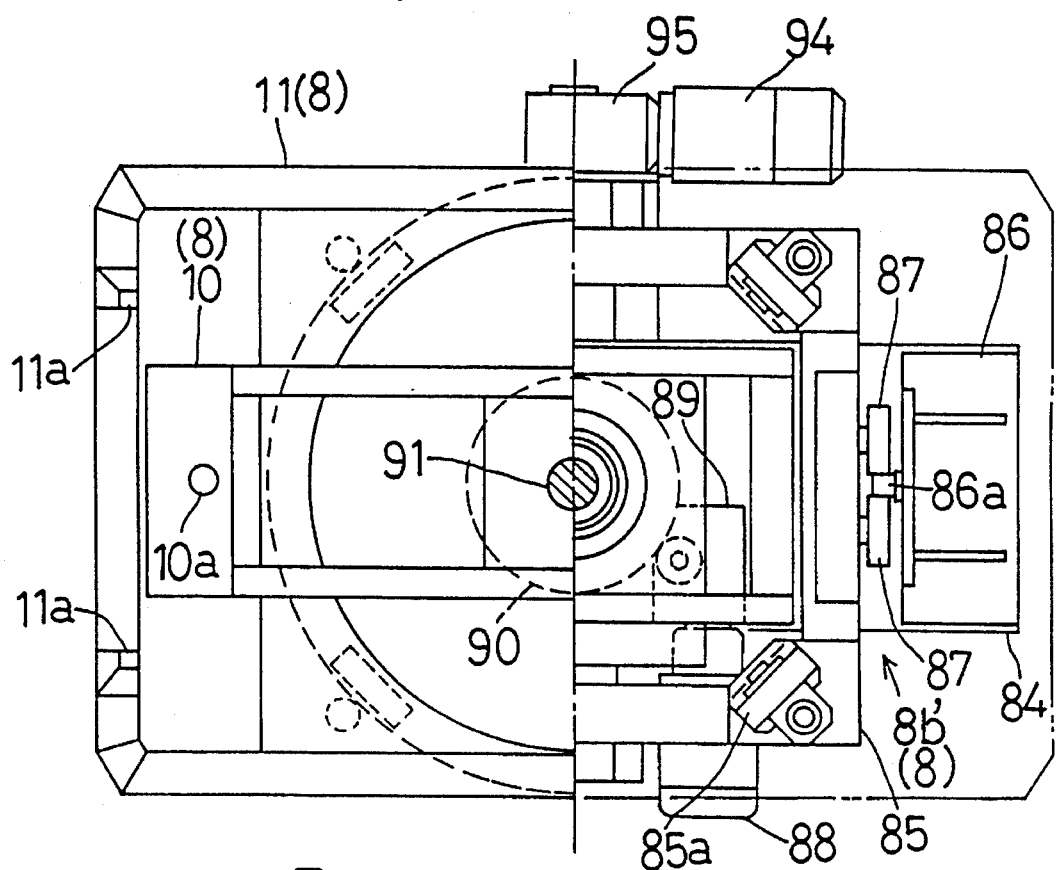
FIG. 9 is plane view of the major portions of the parking system of FIG. 8.
Figure 10:
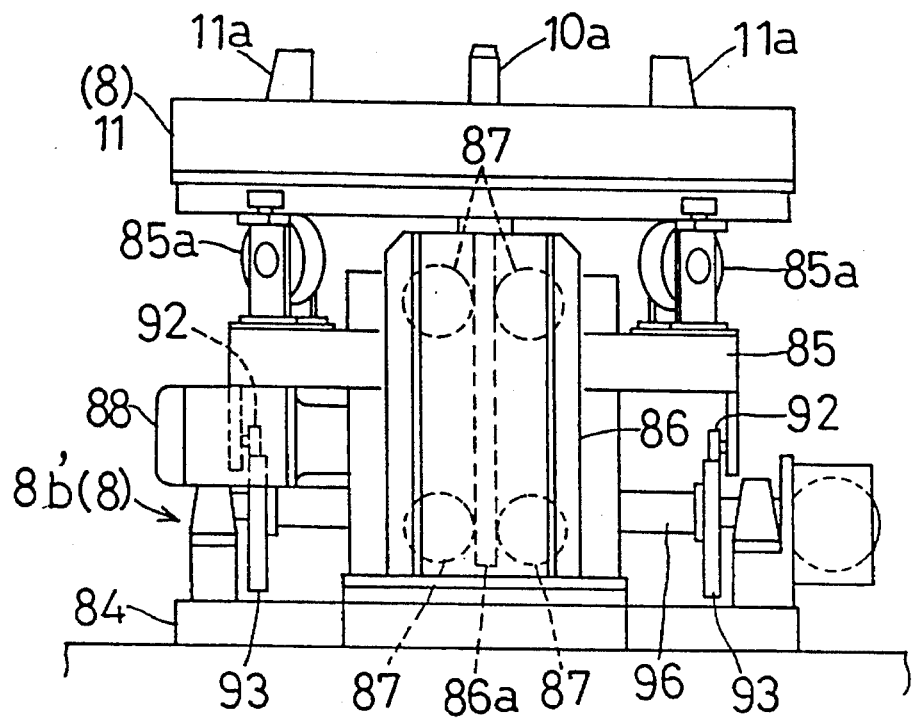
FIG. 10 is a rear view showing the major portions of the parking system of FIG. 8.

As shown in FIGS. 8 through 10, a central portion of this turntable device 8 is connected with the swivel shaft 91. The device includes the turntable 10 comprising a rectangular fame member rotatable about an axis of the swivel shaft 91 and a further rectangular frame member slightly larger than the turntable 10. The turntable device 8 further includes the pallet-mounting portion 11 swivellable in unison with the turntable 10 and an elevator mechanism 8b' capable of elevating the pallet-mounting portion 11 within a predetermined vertical range.

Next, the turntable 10 will be detailed. The swivel shaft 91 connected to the central position of the turntable 10 mounts the swivel gear 90 which receives the drive force from the swiveling drive motor 88 through the reduction mechanism 89, such that with this power the turntable 10 effects a swiveling movement without being moved in the vertical direction.

The turntable 10 includes engaging portions 10a (specifically, pins 10a projecting at two forward and rear positions on the upper surface of the turntable 10 as illustrated in FIG. 10) engageable from under engaged portions 3a formed in the pallet 3.

Further, these engaging portions 10a of the turntable 10 and the engaged portions 3a of the pallet 3 are provided with such correlated surface configurations and lengths that these engaging and engaged portions are vertically movable relative to each other and also that engaged condition between these portions 10a, 3a are still maintained when the pallet-mounting portion 11 is lifted up to an upper limit position of a predetermined range to be described later.

Next, the pallet-mounting portion 11 and the elevator mechanism 8b' will be described with reference to FIGS. 8 through 10. On the bottom surface of the pit 82, there is disposed the base structure 84. This base structure 84 includes, at two forward and rear positions thereof relative to the entrance/exit section 7, vertically extending guide posts 86 each having a vertical rail 86a. The elevator frame 85 carries, at each of two forward and rear positions thereof, four guide rollers 87 which are guided along the vertical rail 86a of the guide post 86, such that through guiding of the rollers along the rail the elevator frame 85 is smoothly moved up and down. Further, inwardly of the rollers towards the elevator frame 85, there is provided the cam follower 92 having a circular configuration in its side view. For vertically moving this cam follower 92, the eccentric cam 93 is attached to the base structure 84. These members constitute the cam mechanism through which the elevator frame 85 is supported. And, through cam movement of the mechanism, the elevator frame 85 can move up and down.

The elevator frame 85 carries, at four peripheral positions thereof, the four bearing rollers 85a. As being rotatably supported and guided by these four bearing rollers 85a, the pallet-mounting portion 11 is swiveled.

That is, the cam mechanism including the cam follower 92 and the eccentric cam 93 in combination comprises the elevator mechanism 8b' for vertically moving the pallet-mounting portion 11 through the elevator frame 85. As this pallet-mounting portion 11 is vertically moved within the predetermined range, the pallet 3 carrying the automobile A is moved between the height position of the pallet supported on the holding unit B to the upper predetermined position.

The pallet-mounting portion 11 includes stopper portions 11a (specifically, the stopper portions 11a projecting at four positions on the upper surface of the pallet-mounting portion 11, as illustrated in FIGS. 8 through 10. Each stopper portion is configured like a quarter of a truncated square cone).

In the above-described embodiments, the entrance/exit section 7 is constructed so as to act both the entrance and exit for the automobile. It should be noted, however, that the present invention may be embodied in a different type of automated high-raised parking system where the section 7 is used solely as the entrance and a further section is provided for the exit, or conversely where the section is used as the exit only where a further section is provided as the entrance for the automobile.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which become within the meaning and range of equivalency of the claims are therefore intended to be embraced therein.

What is claimed is:

1. An automated high-raised parking system comprising:

a parking construction including a parking rack structure having a plurality of stories of parking racks for parking an automobile which is mounted on a pallet, a lift passage having a lift-translator device, said lift passage being formed beside said parking racks, said lift-translator device including a lift table and a translator device, and an automobile entrance/exit section for allowing entrance and exit of the automobile to and out of said parking construction, a holding unit being provided at a same height as a ground-level floor of said entrance/exit section, said holding unit being adapted for holding ends of said pallet so as to maintain a horizontal posture of said pallet mounting the automobile and also to prevent said pallet from being moved lower than said ground-level floor, wherein within said parking construction the automobile is mounted on said lift table and vertically moved to a predetermined one of said racks and then translated by said translator device onto said predetermined rack; and a turntable device provided at said entrance/exit section, said turntable device including a turntable which swivellably holds, at a center thereof, said pallet mounting the automobile thereon so that an orientation of the automobile on said pallet is changed by swiveling said turntable, said turntable device further including an elevator mechanism for elevating said turntable so as to allow an upward movement of said pallet relative to the height of said entrance/exit section, wherein said elevator mechanism includes a base structure, a cam follower coupled to said turntable, an eccentric cam coupled to said base structure for vertically moving said cam follower and a drive unit attached to said base structure for driving said eccentric cam.

2. An automated high-raised parking system as defined in claim 1, wherein said parking construction includes a pair of said parking rack structures at forward and rear areas of the construction, with said rack structures being disposed apart from each other with a space therebetween.

3. An automated high-raised parking system as defined in claim 1, wherein said automobile entrance/exit section is constructed as an automobile entrance which is opened on a ground level of and at one side of said parking construction.

4. An automated high-raised parking system as defined in claim 3, wherein in said ground-level floor of said automobile entrance/exit section, a forward ground portion is formed at the same level as said ground-level floor and rearwardly of said forward ground portion a pit is dug into the ground.

5. An automated high-raised parking system as defined in claim 4, wherein said holding unit comprises a combination of a block laid to provide the same height as said ground-level floor and of said forward ground portion of the ground-level floor.

6. An automated high-raised parking system as defined in claim 1, wherein said lift table has right and left ends thereof suspended by a cable which said right and left ends are vertically moved by a cable drive unit.

7. An automated high-raised parking system as defined in claim 6, wherein said cable is guided by being reeved around a pair of right and left drive pulleys rotatably driven by said cable drive unit on the ground level of said parking construction.

8. An automated high-raised parking system as defined in claim 1, wherein said translator device includes a pair of right and left expandable forks so as to selectively provide a state where said forks are longitudinally expanded from a center of said lift table and a further state where said forks are accommodated within an area limit of said lift table.

9. An automated high-raised parking system as defined in claim 1, wherein each said eccentric cam and cam follower has a circular configuration in its side view.

10. An automated high-raised parking system comprising:
a parking construction including
a parking rack structure having a plurality of stories of parking racks for parking an automobile which is mounted on a pallet;
a lift passage having a lift-translator device, said lift passage being formed beside said parking racks, said lift-translator device including a lift table and a translator device; and
an automobile entrance/exit section for allowing entrance and exit of automobiles into and out of said parking construction, a holding unit being provided at a same height as a ground-level floor of said entrance/exit section, said holding unit being adapted for holding ends of said pallet so as to maintain a horizontal posture of said pallet mounting the automobile and also to prevent said pallet from being moved lower than said ground-level floor;
wherein the automobile is mounted on said lift table and is vertically moved within said parking construction to a predetermined one of said racks and is then translated by said translator device onto said predetermined rack; and
a turntable device provided at said entrance/exit section, said turntable device including a turntable which swivellably holds said pallet mounting the automobile thereon so that an orientation of the automobile on said pallet is changed by swiveling of said turntable, said turntable device further including an elevator mechanism for elevating said turntable so as to allow an upward movement of said pallet relative to the height of said ground-level floor of said entrance/exit section, wherein said parking construction includes a pair of said parking rack structures at forward and rear areas of said construction, with said rack structures being disposed apart from each other with a space therebetween, and wherein said automobile entrance/exit section is constructed as an automobile entrance which is opened on a ground level of said parking construction, wherein said elevator mechanism includes a base structure, a cam follower coupled to said turntable, an eccentric cam coupled to said base structure for vertically moving said cam follower and a drive unit attached to said base structure for driving said eccentric cam.

11. An automated high-raised parking system as defined in claim 10, wherein said translator device includes a pair of right and left expandable forks so as to selectively provide a position where said forks are longitudinally expanded from a center of said lift table and a second position where said forks are accommodated within an area limited by said lift table.

12. An automated high-raised parking system as defined in claim 11, wherein said lift table has right and left ends thereof suspended by a cable which said right and left ends are vertically moved by a cable drive unit.

* * * * *